United States Patent [19]

Phillips

[11] Patent Number: 4,778,329
[45] Date of Patent: Oct. 18, 1988

[54] ROBOT WITH FLOATING XY PLANE ARM

[75] Inventor: Gregory A. Phillips, Anderson, Ind.

[73] Assignee: General Motors Corporation, Detroit, Mich.

[21] Appl. No.: 842,302

[22] Filed: Mar. 21, 1986

[51] Int. Cl.$^4$ .............................................. B66C 1/00
[52] U.S. Cl. .................................. 414/589; 414/732; 901/16; 901/45
[58] Field of Search ................. 901/45, 16; 33/169 C, 33/185 R; 414/732, 733, 589, 590

[56] References Cited

U.S. PATENT DOCUMENTS

| | | | |
|---|---|---|---|
| 3,885,295 | 5/1975 | Engleberger et al. | 901/45 X |
| 4,179,783 | 12/1979 | Inoyama et al. | 901/45 X |
| 4,229,136 | 10/1980 | Panissidi | 901/16 X |
| 4,367,591 | 1/1983 | Hirabayashi et al. | 33/185 R X |
| 4,396,344 | 8/1983 | Sugimoto et al. | 901/18 X |
| 4,400,885 | 8/1983 | Consales | 901/45 X |
| 4,501,825 | 12/1985 | Sakata | 414/753 |
| 4,561,176 | 12/1985 | Leddet | 29/709 |
| 4,569,183 | 2/1986 | De Santis | 53/534 |
| 4,573,271 | 3/1988 | Hamilton et al. | 901/45 X |
| 4,609,325 | 9/1986 | Gabrielli | 901/45 X |
| 4,629,385 | 12/1986 | Irie | 901/45 X |

FOREIGN PATENT DOCUMENTS 0639701 11/1978 U.S.S.R.
1212782 2/1986 U.S.S.R.

OTHER PUBLICATIONS

"Linear Motion Technology Guide", Thompson Industries, Inc., Port Washington, N.Y., 1986, pg. 31.

Primary Examiner—Robert J. Spar
Assistant Examiner—Jennifer L. Doyle
Attorney, Agent, or Firm—Ernest E. Helms

[57] ABSTRACT

The present invention provides an apparatus and method of utilization thereof of a robot with a floating arm. The floating arm aspect of the robot allows the robot to align its associated tooling with the workpiece in situations where the workpiece may be in a variety at different locations. By use of the present invention the requirement for use of a vision system to accomplish alignment between the robot and the workpiece is eliminated.

5 Claims, 3 Drawing Sheets

ROBOT WITH FLOATING XY PLANE ARM

FIELD OF THE PRESENT INVENTION

The field of the present invention is of robots and methods of utilizing the same for performing operations on workpieces. More particularly the present invention relates to robots and methods of utilization of the same for material handling operations.

DISCLOSURE STATEMENT

Robots are utilized in various operations in industry. One of the major operations of robots in industry is in the material handling area. Robots are often used to take a given workpiece from one storage area to a conveyer line or machining area.

When utilized in the machine handling mode, it is often common to present the workpieces to the robot in a stacked position. The robot must pick up the workpiece from the stacked position and then transport the workpiece to a given storage area, conveyer line, or machining area. The workpieces can often be slightly warped or presented to the robot in a slightly mispositioned manner. The above-described conditions are often present when using a robot to move plastic preform material trays.

Since the travel pattern of the robot is fixed, the position of the workpiece or tray must be carefully maintained. Misalignment between the robotically held tool and the workpiece will cause a failure in operation or possible damage to the tool or workpiece.

One method of overcoming the mispositioning of the presented workpiece is to incorporate into the robot an artificial vision system which looks for the workpiece. Vision systems add complexity to the robot and increase the possibilities of technical failures of the robot stopping production. Vision systems often require markings or other preparations on the workpiece so that the robot may properly identify the workpiece or the workpiece's location. Also vision systems can significantly increase the cost associated with a robotic system.

Another method to provide compliance without the use of vision systems is to provide a robotic arm with a deformable material such as rubber, captured between two metallic plates. The rubber will deform to provide compliance. The deformable type compliance devices are severely limited in that they do not provide the amount of compliance needed in many applications. Also, deformable material compliance type devices are severely limited in load capabilities as well as being subject to fatigue failure problems.

SUMMARY OF THE INVENTION

To overcome the above noted and other problems the present invention is brought forth. The present invention provides a robot and method of utilization of the same which has a floating arm. The use of the floating arm allows the tool carried by the robot to align itself with a given workpiece. In the preferred embodiment the arm of the robot has projecting pins which make contact with cam surfaces provided by the attached tool to fix the location of the tool with the arm. Therefore when the robot places the workpiece in a new desired area, the workpiece will be in a proper orientation with respect to the robot regardless of its original misaligned position. Also a vision system will not be required to allow the robot to pick up a misaligned workpiece. The robot will automatically compensate for misalignment between the program robotic movement and the presented workpiece.

It is an object of the present invention to provide a robot with a floating arm. It is also an object of the present invention to provide a robot which allows the attached tooling to adjust to the position of the workpiece without the use of an artificial vision system. It is also an object of the present invention to provide a method of utilizing a robot to operate on a piece which may be misaligned in relation to the program travel of the robotic arm.

More particularly an object of the present invention is to provide a robot with an extended arm for positioning an attached tool to perform a given operation on a workpiece, said combination including base means to support said arm, transverse motion means to move said arm in a first horizontal plane, vertical motion means to move said arm perpendicular to said first horizontal plane, float means including a first bearing block slidably mounted on a first shaft biased to a neutral poition and a second shaft transverse with said first shaft and attached with said first bearing block, and a second bearing block connected with said tool and slidably mounted on said second shaft, said second bearing block being biased to a neutral position allowing said arm to float in a horizontal plane, whereby to facilitate the alignment of said tool with a workpiece, and tapered projectable pins connected with said arm having a tapered surface for contact with guide means associated with said tool to fix the location of said tool in relation to said arm.

Other objects, desires and advantages of the present invention will become more apparent to those skilled in the art as the nature of the invention is better understood from the accompanying drawings in a detailed description.

DETAILED DESCRIPTION OF THE DRAWINGS

Figure 1:
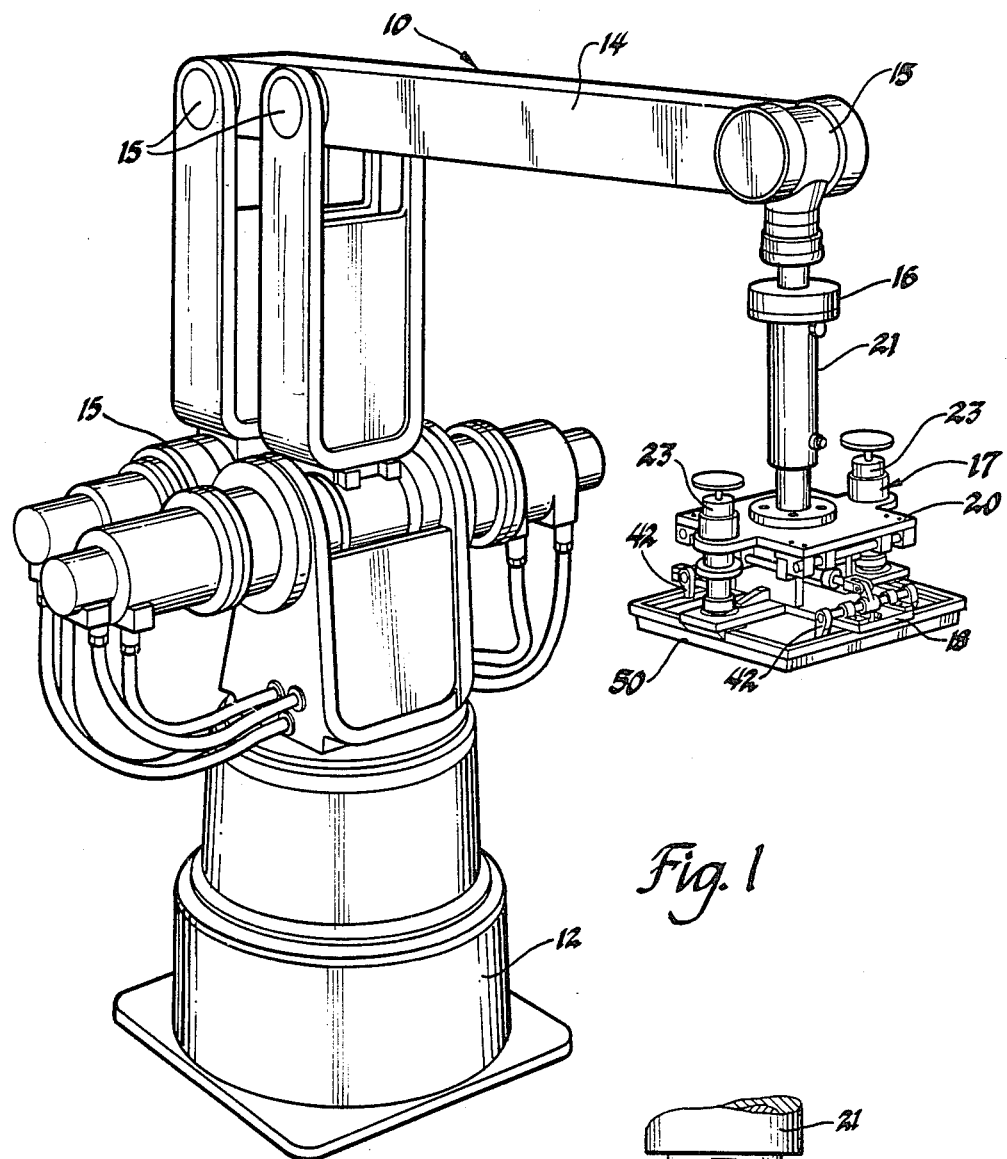
FIG. 1 is a perspective view of a robot of the present invention.

Referring to FIG. 1 robot 10 has a base 12 with a multi-membered arm represented in total by item 14. The base provides a means of angular rotation to translate the robotic arm in a given plane usually orientated horizontally. The robotic arm bends along its joints 15 to allow the far end of the robotic arm to be translated in a line at a predetermined angle with its horizontal translation. The robot 10 can perform its horizontal and vertical translations separately or simultaneously. At the end of the robotic arm 14 is a robotic wrist 16, a wrist extension 21, and a lower arm 17 which has attached thereto an operational tool 18. As will be explained in more detail at a later time operational tool 18 is provided to grip the workpiece 50 which is to be transported by the robot 10.

Figure 3:
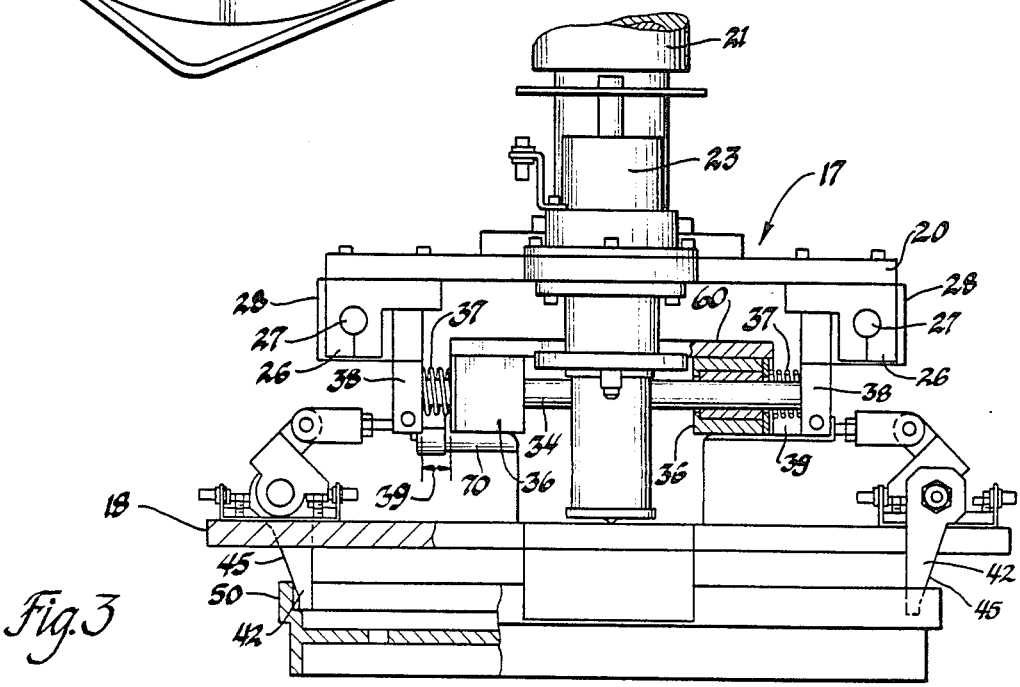
FIG. 3 is a front elevational view partially in section of the embodiment illustrated in FIG. 2.
Figure 4:
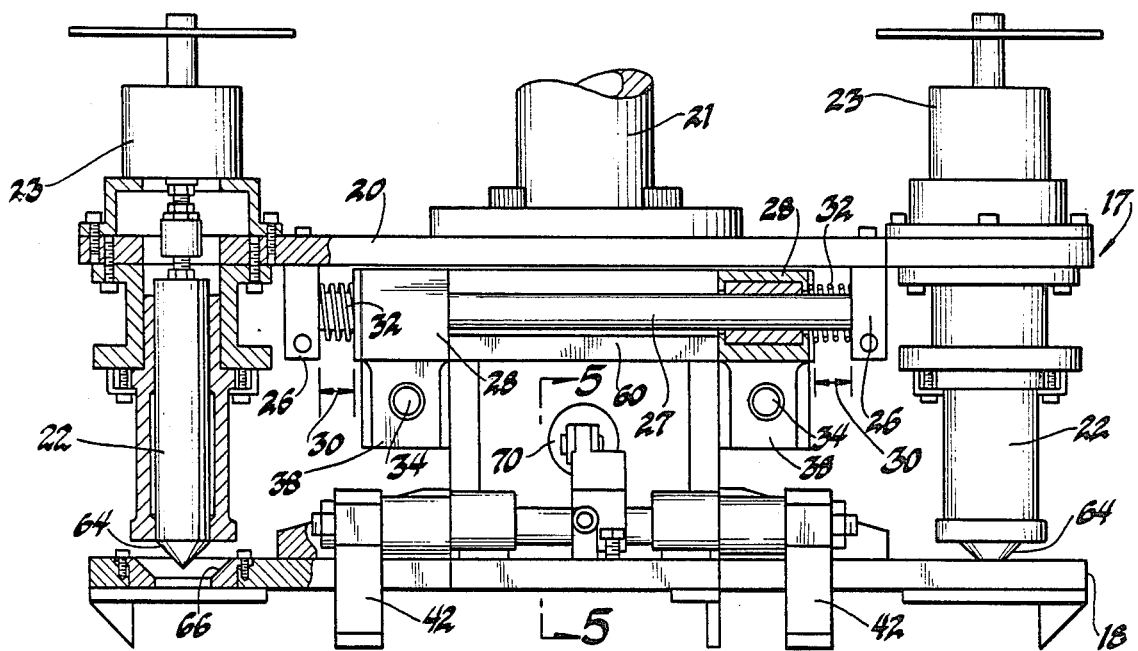
FIG. 4 is a side elevational view partially in section of the embodiment illustrated in FIG. 2.
Figure 2:
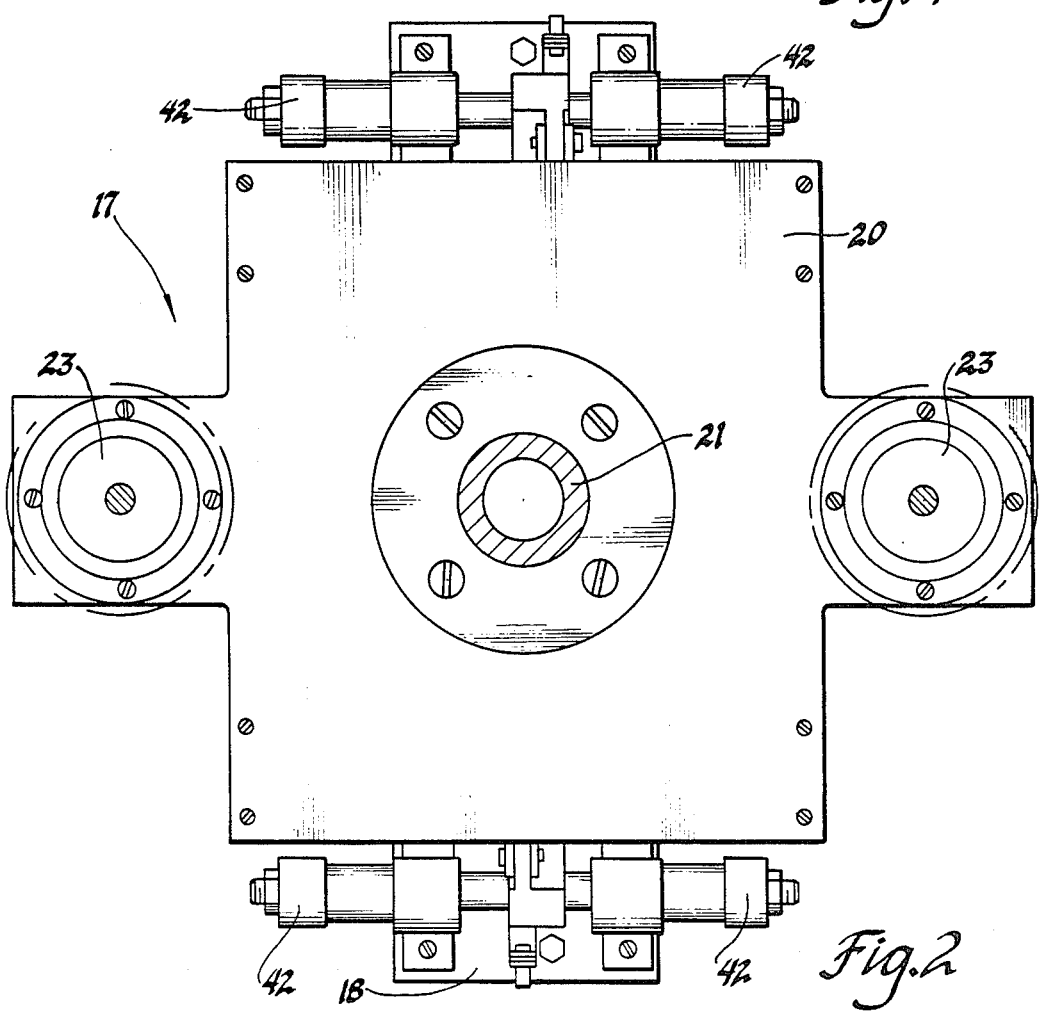
FIG. 2 is a top elevational view of an embodiment of the present invention.

Referring to FIGS. 2, 3 and 4, the robotic lower arm 17 is provided having a mounting plate 20 which provides a surface of attachment to wrist extension 21. The mounting plate 20 has at its opposite ends fixably connected thereto tapered locking pins 22 whose function will be described at a later point.

Tool 18 is provided with compliance (float) in the X and Y directions in relationship to the top plate 20 by lower arm 17. Fixably connected with and extending downward from plate 20 are four X shaft support members 26 which support two parallel X shafts 27. Plate 20, X shaft support 26 and X shafts 27 are fixed to one another.

Slidably mounted on the X shafts 27 are four X bearing blocks 28. The X bearing blocks 28 are fixably connected with one another and also have descending from them integrally joined Y shaft support members 38. Fixably joined to Y shaft support members 38 are two parallel Y shafts 34 which are transversely mounted in relationship to the X shafts 27.

Figure 5:
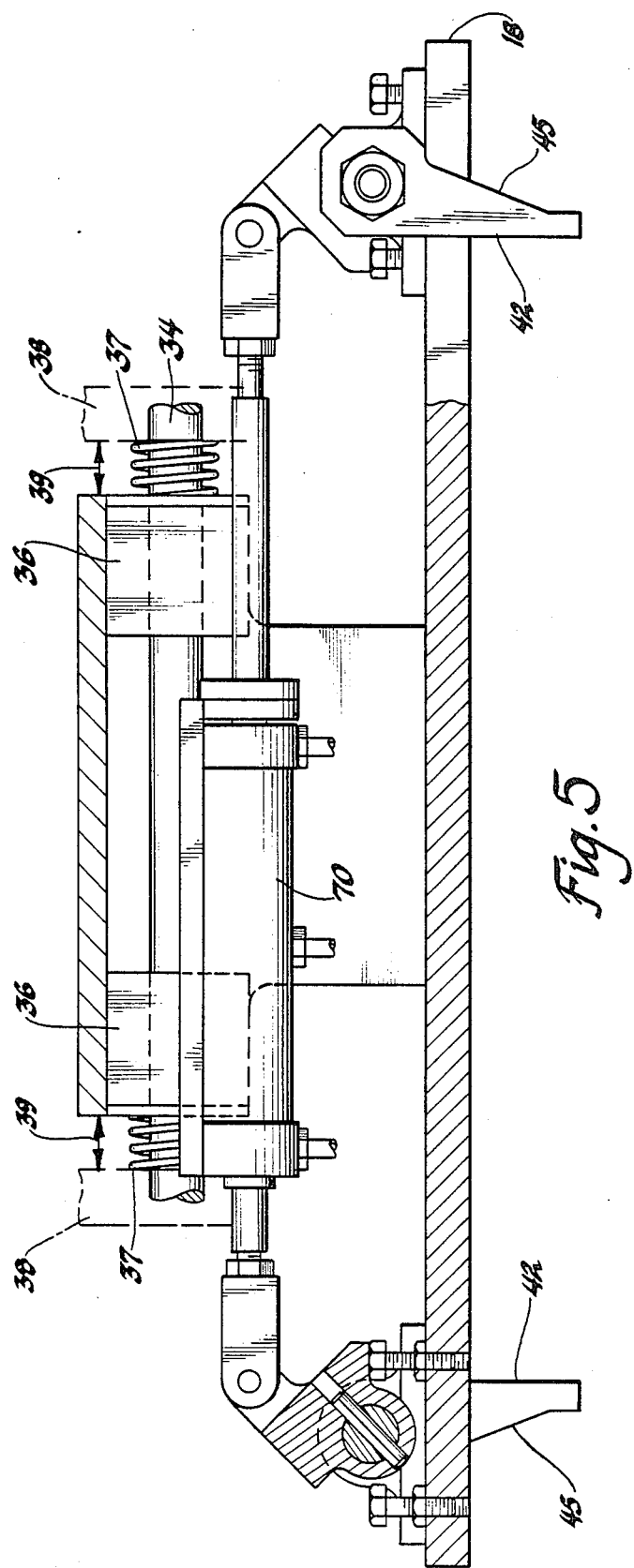
FIG. 5 is a partial sectional view taken along lines 5—5 of FIG. 3.

Tool 18 is fixably connected to four Y bearing blocks 36 via plate 60 (FIG. 5) which are in turn slidably mounted on the two Y shafts 34.

The X bearing blocks 28 are provided with clearances 30 between the bearing blocks 28 and the X shaft support 26. To maintain the X bearing blocks 28 in a preset or neutral position there is provided biasing springs 32. In like manner the Y bearing blocks 36 have a clearance 39. Biasing springs 37 position the Y shafts 34 to a neutral position.

Referring to FIGS. 1, 2, 3, 4 and 5, in operation the robotic arm 14 is transversely displaced in a first plane by the robotic base 12. Separately or simultaneously the robotic arm 14 will move in a vertical direction having a fixed angular orientation with the first plane. The tapered tool pick up levers 42 will make the first initial contact with the box shown as 50. The cam surface 45 on the pick up levers causes the tool 18 to be urged into an orientation to properly pick up the box 50. The combination of the tool 18 and the robotic lower arm 17 will act as three separate members. Since the tool 18 is rigidly connected with the bearing block 36, Y compliance will be provided by translational sliding motion of the Y bearing blocks 36 upon Y shaft 34. Compliance in the X direction will be provided by translational sliding motion between X bearing blocks 28 and X shafts 27.

When the tool 18 is placed in the proper position in relationship to the box 50, the pick up levers 42 will be activated by cylinder 70.

After the robotic levers 42 are activated to pick up the box 50, the alignment pins 22 connected with air cylinders 23 are projected downwards. A tapered surface 64 of the alignment pins will then make contact with a guide cam tapered surface 66 provided upon tool 18, bringing the tool 18 into a fixed position with respect to the robotic lower arm 17. Therefore upon the robot 10 transporting the workpiece 50 to a new location, the workpiece 50 will be at an exact aligned position with respect to robotic lower arm 17 as desired regardless of its initial position when picking up the workpiece.

One advantage provided by the present invention is that by the simple lengthening of the X or Y shafts the maximum compliance allowable for the robotic arm may be easily modified.

The method of the present invention for utilizing a robot having an arm extended from a robotic base support to positioning the robotic arm in a desired location in relationship to a workpiece includes the following steps of:

1. Supporting a robotic arm from a robotic place.
2. Displacing the robotic arm in a first plane.
3. Displacing said robotic arm along a fixed line at a predetermined angle with the first plane.
4. Floating the tool only in a second fixed plane at a predetermined angle with the fixed line to align the tool with the workpiece by relative sliding motion in a plane between two members of the arm.

While a few of the embodiments of the present invention have been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follow:

1. A robot with an extended arm for positioning an attached tool to perform a given operation on a workpiece, said robot in combination comprising:
   base means to support said arm;
   transverse motion means to move said arm in a first horizontal plane;
   vertical motion means to move said arm perpendicular to said first horizontal plane;
   float means for supporting an attached tool including a first bearing block slidably mounted on a first shaft, and a second shaft transverse with said first shaft and attached with said first bearing block, and a second bearing block slidably mounted on said second shaft and connected with said tool allowing said tool to float only in a plane fixed with respect to said first horizontal plane, whereby to facilitate the alignment of said tool with a workpiece; and
   tapered pins connected with said arm having a tapered surface for contact with guide means associated with said tool to fix the location of said tool in relation to said arm.

2. A robot as described in claim 1 wherein said tapered pins are vertically retractable.

3. A robot as described in claim 1 further including biasing means biasing said first and second bearing blocks to a preset position.

4. A method of utilizing a robot with an arm with an attached tool which is extended from a robotic base support to position the robot in a desired location in relationship to a workpiece to perform an operation on said workpiece, said method including in combination:
   supporting a robot arm from a robot base;
   displacing said robot arm in a first plane;
   displacing said robot arm along a fixed line at a predetermined angle with said manner first plane;
   floating said tool only in a fixed second plane at a predetermined angle with said fixed line to align said tool with said workpiece by translational sliding motion of two members which support the tool relative to each other and the arm; and
   locking the location of said tool by locking said two members in relation to said arm subsequent to floating said tool to align said tool with said workpiece.

5. A method as described in claim 4 further projecting tapered pins connected with said arm into guide cam surfaces of said tool.

* * * * *